Patented Nov. 7, 1944

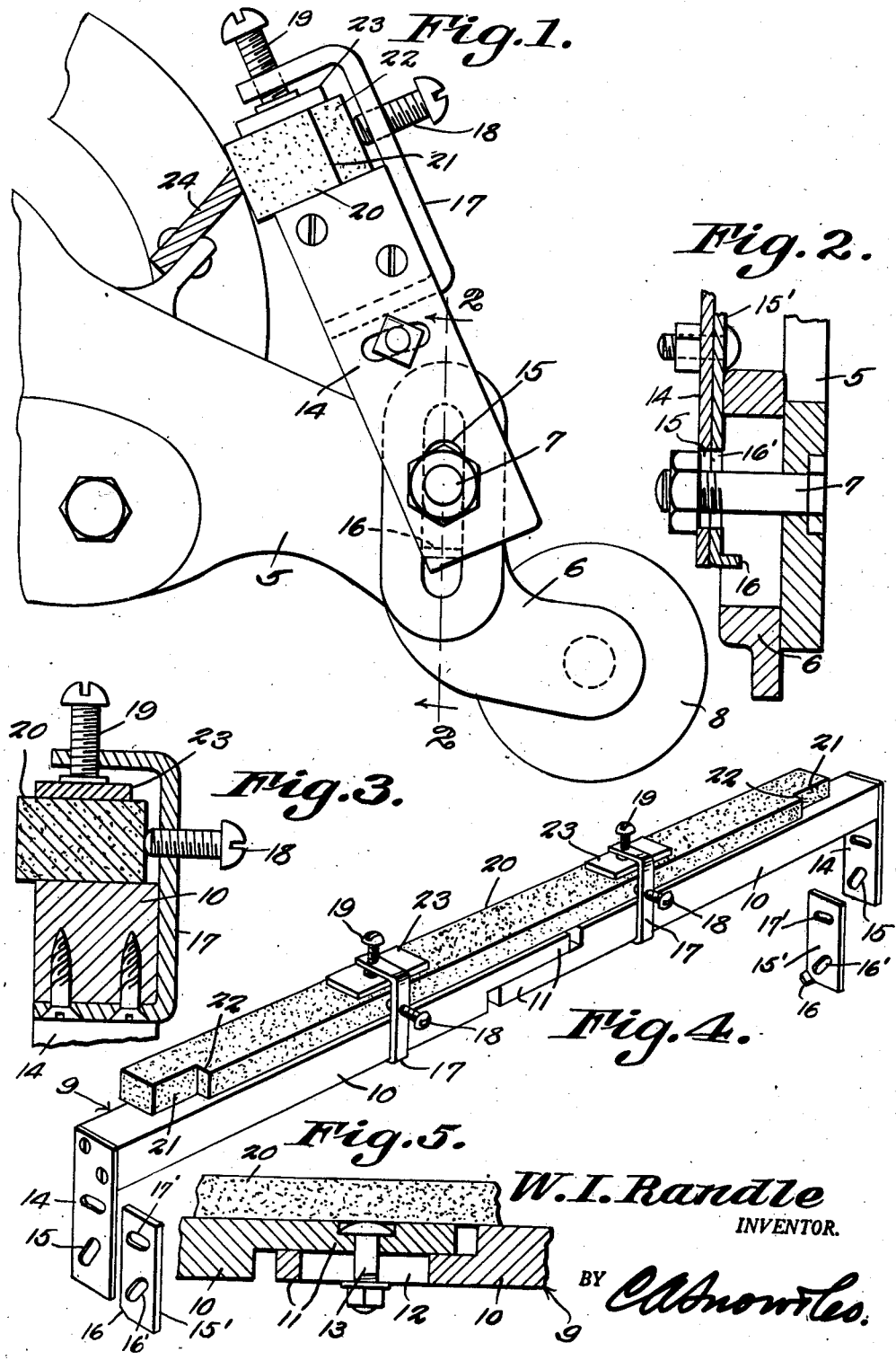

2,362,400

UNITED STATES PATENT OFFICE 2,362,400

LAWN MOWER SHARPENER

Wilbert I. Randle, Cockeysville, Md.

Application March 15, 1943, Serial No. 479,261

3 Claims. (Cl. 51—250)

This invention relates to lawn mower sharpeners, the primary object of the invention being to provide a lawn mower sharpener which may be readily and easily attached to a lawn mower frame, in such a way that the rotary blades of the mover, will wipe the abrading member of the sharpener, with the result that the blades will be accurately sharpened, by the normal process as when in cutting a lawn.

An important object of the invention is to provide a device of this character which may be adjusted for use in connection with lawn mowers having blades of various lengths.

Another object of the invention is to provide a sharpener of this character including a supporting bar and an abrading member, means being provided for adjustably mounting the abrading member on the supporting bar, so that the abrading member may be adjusted towards or away from the blades to insure proper contact of the blades with the abrading member for the accurate sharpening of the blades.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing

Figure 1 is an end elevational view illustrating a sharpening device constructed in accordance with the invention, as mounted on a mower frame.

Figure 2 is a sectional view taken on line 2—2, Figure 1.

Figure 3 is a sectional view through the supporting bar and abrading bar, illustrating the means for clamping the abrading bar to the supporting bar.

Figure 4 is a perspective view of the sharpening device.

Figure 5 is a fragmental sectional view illustrating the overlapping ends of the supporting bar sections, whereby the adjustment in the length of the supporting bar, is accomplished.

Referring to the drawing in detail, the reference character 5 designates one of the rearwardly extended roller arms of a lawn mower, to which the roller brackets 6 are adjustably connected.

These roller brackets 6 are formed with elongated openings, through which the bolts 7 extend, the bolts 7 securing the roller brackets in position on the roller arms 5 so that the roller, indicated by the reference character 8, may be adjusted vertically to vary the height of cut of the rotary blades of the mower.

The sharpening device forming the essence of the present invention, is attached to the roller arms 6, as shown by Fig. 1 of the drawing.

The sharpener embodies a supporting bar 9, which comprises a pair of sections 10 that are rectangular in cross-section, presenting a flat surface, against which the abrading bar, indicated by the reference character 20, is supported.

The adjacent ends of the sections 10, are partially cut away, providing overlapping ends 11, one of the ends 11 being provided with an elongated opening 12 through which the bolt 13 extends, the bolt 13 being fitted in an opening of the cooperating end 11 of the adjacent section, whereby the sections 10 may be adjusted longitudinally, with respect to each other, to lengthen or shorten the supporting bar adapting it for use in connection with mowers having blades of various lengths.

Plates 14 are secured at the ends of the supporting bar, and extend rearwardly therefrom, the plates being formed with openings 15 disposed at oblique angles with respect to the side edges of the plates. These openings 15 are slightly elongated, and are disposed adjacent to the free ends of the plates, as clearly shown by the drawing. The support for the bar 9 also includes plates 15' that have elongated openings 16' and 17' adapted to align with the openings of the plates 14 for the reception of the bolts 7, whereby the support for the bar 9 may be adjusted to various angles, adapting the device for use with different types of mowers. One corner of each plate 15' is turned inwardly, providing ears 16 at the ends of the plates, the ears being of widths to fit within the elongated openings of the roller arms. Thus it will be seen that when the device is positioned, and the ears 16 are properly placed within the elongated openings, the bolts 7, which pass through the plates, will secure the plates 14 in the proper angular position to support the abrading bar for accurate work.

Secured to each section 10 of the supporting bar, is a bracket 17, which brackets have one of their respective ends extended upwardly and laterally over the upper surface of the supporting bar, in spaced relation therewith. The brackets 17 are formed with openings for the reception of the set-screws 18, while the laterally extended ends of the brackets 17, are formed with threaded openings to receive the set-screws 19.

The abrading bar 20 corresponds in length with the length of the cutting blades of the lawn mower with which it is used.

The ends of the abrading bar are formed with offsets 21, so that when the device is positioned on a mower having sixteen-inch blades, the ends of the blades will aline with the shoulders 22 of the abrading bar, so that the edge of the abrading bar that contacts the cutting blades, will be of equal length with the blades.

It will of course be understood that when the abrading bar is secured to the supporting bar for use on sixteen-inch cutting blades, the abrading bar will be removed from the position as shown by Fig. 4, and reversed, so that the edge of the abrading bar formed with offsets, will be presented to the blades.

Gibs indicated at 23 are positioned between the set-screws 19 and the abrading bar 20, so that the abrading bar will not be damaged by the screws 19, when the screws are operated in clamping the abrading bar to the supporting bar.

In Fig. 1 of the drawing, the rotary blades of the lawn mower are indicated by the reference character 24, and upon considering Fig. 4 of the drawing, the operation of the sharpening device will be obvious.

It might be further stated that owing to the construction of applicant's sharpening device, the sharpening device may be retained on the mower, while the mower is being operated to mow the lawn.

What is claimed is:

1. In a lawn mower rotary blade sharpener, a supporting bar embodying a pair of sections, a bracket secured to one of the respective ends of each section, the opposite ends of the sections being cut away providing offset portions adapted to overlap, a bolt extending through the overlapped ends of the sections and adapted to secure the sections in adjusted relation with respect to each other, bolts adapted to extend through the brackets, securing the sections in position on a lawn mower, an abrading bar adapted to be positioned on the supporting bar, and brackets adapted to clamp the abrading bar to said supporting bar.

2. In a lawn mower rotary blade sharpener, a supporting bar embodying a pair of sections, a bracket secured to one of the respective ends of each section, said sections having their inner ends cut away and overlapped, a bolt extended through the overlapped ends of said sections and adapted to adjustably secure the sections together, an abrading member positioned on the supporting bar, substantially U-shaped clamps adapted to engage the abrading member and supporting bar, securing said abrading member to the supporting bar, adjustable means on the U-shaped members adapted to engage said abrading bar, whereby said abrading bar is adjusted with respect to the rotary blades of a lawn mower with which the device is used, and brackets at the ends of said supporting bar adapted to be secured to the roller-supporting arms of a lawn mower, securing the abrading bar in position.

3. In a lawn mower rotary blade sharpener, a supporting bar embodying a pair of sections, a bracket secured to one of the respective ends of each section, means for adjustably connecting the adjacent inner ends of the sections, an abrading bar adapted to be positioned on the supporting bar, said abrading bar having cut-out portions at the ends thereof, providing a long abrading surface and a substantially short abrading surface at the opposite sides thereof, said abrading bar adapted to rest on the supporting bar, overlying the connected ends of the supporting bar, means for removably securing the abrading bar to the supporting bar, whereby either the short or long abrading surface thereof may be presented to the rotary cutter blades of the mower, and means for securing the brackets to a lawn mower frame.

WILBERT I. RANDLE.